United States Patent [19]
Rouillot et al.

[11] Patent Number: 5,279,522
[45] Date of Patent: Jan. 18, 1994

[54] TRANSMISSION JOINT BODY OF THE TYPE COMPRISING A CONNECTING FLANGE

[75] Inventors: Michel Rouillot, St. Germain en Laye; Bernard Poulin, Ste Honorine; Michel Margerie, Vetheuil, all of France

[73] Assignee: Glaenzer Spicer, Poissy, France

[21] Appl. No.: 778,480

[22] Filed: Oct. 17, 1991

[30] Foreign Application Priority Data

Oct. 22, 1990 [FR] France .................. 90 13038

[51] Int. Cl.$^5$ .................................... F16D 3/205
[52] U.S. Cl. ............................... 464/111; 464/170; 464/905; 464/903
[58] Field of Search ............... 464/111, 170, 182, 903, 464/905

[56] References Cited

U.S. PATENT DOCUMENTS

| | | |
|---|---|---|
| 2,194,798 | 3/1940 | Koppel . |
| 3,792,596 | 2/1974 | Orain .................. 464/111 |
| 3,817,057 | 8/1974 | Orain .................. 464/111 X |
| 4,091,641 | 5/1978 | Welschot .................. 464/111 |
| 4,118,952 | 10/1978 | Kobayashi .................. 464/903 X |
| 4,272,971 | 6/1981 | Loyd et al. .................. 464/903 X |
| 4,360,209 | 11/1982 | Ukai et al. .................. 464/111 X |
| 4,417,880 | 11/1983 | Kumagai et al. .................. 464/111 |
| 4,540,385 | 9/1985 | Krude .................. 464/182 X |
| 4,747,806 | 5/1988 | Krude et al. .................. 464/182 |
| 5,007,881 | 4/1991 | Hazebrook .................. 464/170 X |

FOREIGN PATENT DOCUMENTS

| | | |
|---|---|---|
| 0335781 | 3/1989 | European Pat. Off. . |
| 1268917 | 6/1961 | France .................. 464/111 |
| 2508851 | 1/1983 | France . |
| 2619878 | 8/1988 | France . |
| WO84/03544 | 9/1984 | |

Primary Examiner—Daniel P. Stodola
Assistant Examiner—William G. Battista, Jr.
Attorney, Agent, or Firm—Wenderoth, Lind & Ponack

[57] ABSTRACT

A transmission joint body has an envelope inside which are provided bearing paths for articulation elements of a transmission joint (10). A connection system for the joint body includes a radial flange connected to the envelope. The flange is made at least partially from a material comprising a thermosetting or thermoplastic matrix reinforced with short fibers or with particles. According to a preferred embodiment, the inner space defined radially by the inner peripheral surface of the envelope of the joint body is partially filled with a material comprising a thermosetting or thermoplastic matrix reinforced with short fibers or with particles, and which is extended outside the envelope through one axial end of the latter in order to form the flange.

13 Claims, 1 Drawing Sheet

TRANSMISSION JOINT BODY OF THE TYPE COMPRISING A CONNECTING FLANGE

BACKGROUND OF THE INVENTION

The subject of the present invention is a transmission joint body of the type comprising an envelope inside which are provided bearing paths for articulation elements of a transmission joint, and a system for connecting this joint body to a transmission shaft or to any other part of a mechanical transmission, in particular that of a motor vehicle.

The invention relates more particularly to a transmission joint body in which the connection system comprises a radial flange connected to the envelope. Transmission joint bodies of this type are known which are made from a single metal piece, and in which the fixing flange is produced by forming or by molding and then machined.

It is known that the weight of such a flange is particularly high, and that such a design permits only slight variations in the specification of the flange, and does not allow standard transmission joint bodies to be designed in which only the connection system differs, depending upon the envisaged application.

SUMMARY OF THE INVENTION

In order to overcome these disadvantages, the invention proposes a transmission joint body wherein the flange is made at least partially from a material comprising a thermosetting or thermoplastic matrix reinforced with short fibers or with particles.

The invention finds application more particularly for transmission joint bodies of the type described and illustrated in Patent Application EP-A-0,335,781 (U.S. Pat. No. 5,009,628), in which the inner space defined radially by the inner peripheral surface of the envelope of the joint body is partially filled with a material comprising a thermosetting or thermoplastic matrix reinforced with short fibers or with particles.

In this case, the filling material can then advantageously be extended outside the envelope through one open end of the latter in order to form all or part of the connecting flange.

The flange comprises a series of axial fixing holes distributed regularly about the axis of the joint body, each of which is equipped with a reinforcing element.

Each reinforcing element is a tubular metal insert.

The joint body comprises a series of axial webs produced integrally with the flange and which extend axially from a radial face of the flange to the outer peripheral surface of the envelope.

The filling material extends over the entire outer peripheral surface of the envelope of the joint body, and the filling material extends inside the envelope in order to form a closing wall for one axial end of the envelope of the joint body.

BRIEF DESCRIPTION OF THE DRAWINGS

Other features and advantages of the invention will become apparent upon reading the detailed description below, for the elucidation of which reference should be made to the attached drawings, in which.

DETAILED DESCRIPTION OF THE PREFERRED EMBODIMENT

Figure 2:
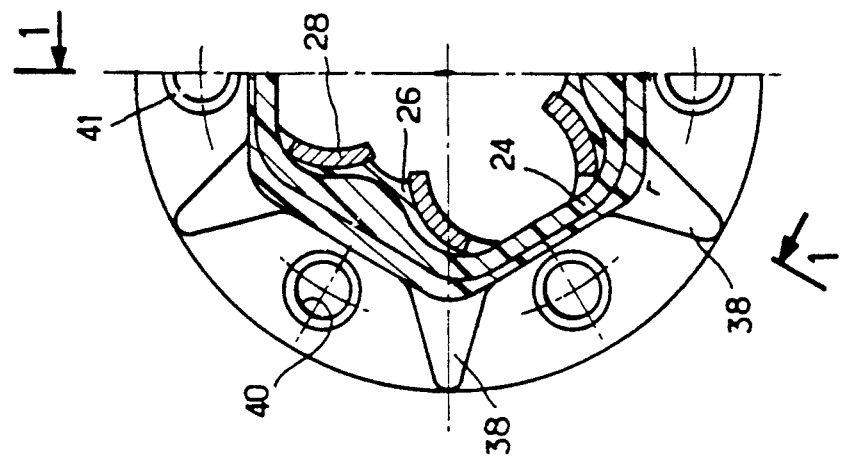
FIG. 2 is a half-view in section along line 2—2 in FIG. 1.

In the figures, a transmission joint 10 has been illustrated, provided in order to connect a shaft 12 to another shaft or to a transmission member (not shown).

In a known manner, the free end 14 of the shaft 12 comprises a tripod 16, each arm 18 of which is equipped with a roller 20.

The tripod 16 interacts with a transmission joint body 22.

The joint body 22, also called a tulip or barrel, is of the type having a composite structure comprising an envelope 24 which defines an inner space which is partially filled with a filling material 26.

The joint body 22 also comprises running paths for the rollers 20 of the tripod 16.

Each running path comprises two metal pieces 28 which are combined with the envelope by the filling material 26.

In the embodiment shown in the figures, the pieces 28 are embedded in the filling material 26, the structure of the joint body 22 being similar to that described and illustrated in Patent Application EP-A-0,335,781, corresponding to U.S. Pat. No. 5,009,628 the contents of which reference should be made in order to ascertain the various structural and embodiment features, and which U.S. patent is hereby incorporated by reference.

Like the peripheral envelope 24, the filling material 26 comprises a thermosetting or thermoplastic matrix which is reinforced with short fibers or with particles.

In order to connect the joint body 22 to a transmission member, the latter comprises a radial connecting flange 30.

In the embodiment shown in the figures, the flange 30 extends in a radial plane situated substantially in the vicinity of an axial end face 32 of the joint body 22 situated opposite the shaft 12.

According to the invention, the radial flange 30 is made from a composite material of the type comprising a thermosetting or thermoplastic matrix reinforced with short fibers or with particles.

In the preferred embodiment according to the invention, the filling material 26 and the flange 30 are made from the same material.

Figure 1:
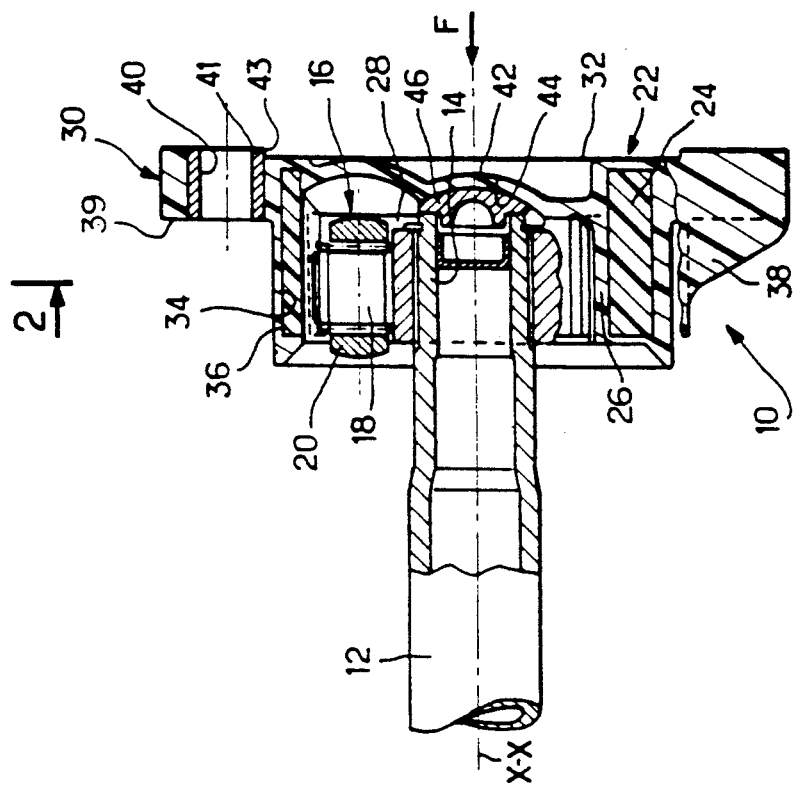
FIG. 1 is a view in axial section along line 1—1 in FIG. 2 of a transmission joint in which joint body is produced according to the teachings of the present invention.
Figure 3:
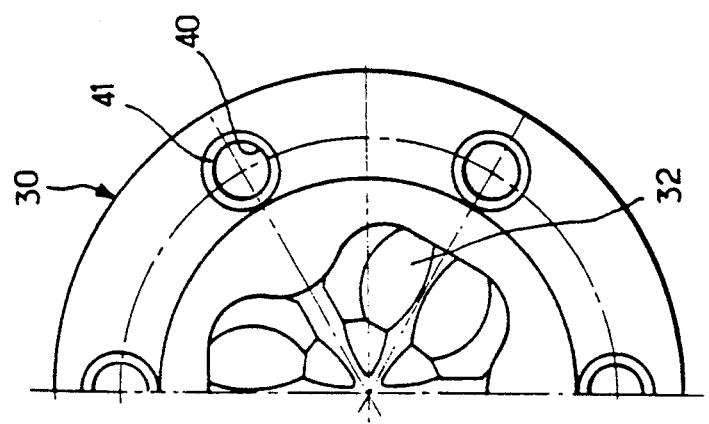
FIG. 3 is a half-view in the direction of arrow F in FIG. 1.

Indeed, the material 26 is extended axially outside the radial inner space defined by the peripheral envelope 24 through the axial end, on the right-hand side when viewing FIG. 1, of the joint body 22, and then radially, in order to form the flange 30, the latter being produced in a single operation during the injection-molding of the material 26 into and around the envelope 24.

The material 26 also extends substantially over the entire outer peripheral surface 34 of the envelope 24 in order to form a peripheral layer 36.

The flange also comprises a plurality of webs 38 produced during the molding which extend in axial planes in order to connect the radial face 39 of the flange to the outer peripheral surface of the envelope 24.

In the embodiment illustrated in the figures, the radial flange 30 comprises six axial connecting holes 40.

Each hole 40 is produced in the form of a hollow tubular metal insert 41 which, like the tracks 28, are embedded in the composite material during the operation of molding the transmission joint body.

The inserts 41 are here smooth-bore tube sections 40, but they could, depending on the envisaged applications, be replaced by internally threaded tubes or by bolts or any other connecting means enabling the flange 30 to be fixed to a transmission member.

Because of the use of a radial flange to connect the joint body, it is particularly advantageous, according to another aspect of the invention, to provide a wall 42 closing the open axial end of the joint body 22 and produced directly by moulding of the filling material 26.

The wall 42, in addition to its closing function, can comprise an inner profile 44, for example in the form of a spherical dome, which complements the outer profile of an end cap 46 of the shaft 12, these two surfaces interacting as a function of the break angle of the joint.

The outer cylindrical wall of the inserts at portions 43 which, according to a feature of the invention, are not surrounded by the composite material, constitute a precise geometrical reference for the centering of the joint body during its assembly by means of the flange.

The closing wall 42 also constitutes an axial-abutment surface for the displacement of the shaft 12 when, as in the case of the embodiment illustrated in the figures, the transmission joint is a joint of the sliding type.

The production of the radial flange 30 by molding of a composite material, in addition to the fact that it considerably reduces its weight, makes it possible to vary its specification very easily for the same design of the joint body 22. These variations can concern, in particular, the axial position of the flange 30 with respect to the joint body, its dimensions and the number of holes 40 and connecting inserts 42 and the radial position thereof with respect to the axis X—X of the joint body 22, and the choice of the constituent materials.

The invention is not limited to transmission joints of the tripod type, nor to sliding joints, but finds applications for all transmission joint bodies, irrespective of the design of the articulation elements and the bearing paths which receive them.

We claim:

1. A transmission joint body, comprising:
   an envelope having a central axis, an inner peripheral surface, opposite axial ends and an outer peripheral surface, said inner peripheral surface of said envelope defining an inner space;
   a plurality of bearing paths defined inside said inner space of said envelope for receiving articulation elements;
   a connection system comprising a flange extending radially relative to said central axis of said envelope, said flange being connected to said envelope and at least partially made of a material comprising a thermosetting or thermoplastic matrix reinforced with short fibers or particles;
   wherein said material comprising a thermosetting or thermoplastic matrix reinforced with short fibers or particles of said flange further extends into and partially fills said inner space of said envelope through one said axial end of said envelope; and
   wherein said flange is integrally formed with said material extending into and partially filling said inner space of said envelope.

2. The transmission joint body of claim 1, wherein said flange comprises a plurality of fixing holes that extend axially therethrough and which are evenly distributed about said central axis of said envelope, and wherein each said fixing hole is provided with a reinforcing element.

3. The transmission joint body of claim 2, wherein each said reinforcing element is a tubular metal insert.

4. The transmission joint body of claim 3, wherein said tubular metal inserts of said fixing holes define a means for centering said transmission joint body during an assembly operation.

5. The transmission joint body of claim 1, wherein said material extending into and partially filling said inner space of said envelope further extends over the entire said outer peripheral surface of said envelope.

6. The transmission joint body of claim 1, wherein said material extending into and partially filling said inner space of said envelope further defines a closing wall closing a said axial end of said joint body.

7. The transmission joint body of claim 1, wherein said material further covers the entire said outer peripheral surface of said envelope and extends into said inner space through both said axial ends.

8. The transmission joint body of claim 1, wherein said bearing paths are defined by a plurality of metal pieces embedded in said material extending into and partially filling said inner space of said envelope.

9. The transmission joint body of claim 8, wherein said flange is integrally formed with said material extending into and partially filling said inner space of said envelope.

10. A transmission joint body, comprising:
    an envelope having a central axis, an inner peripheral surface, opposite axial ends and an outer peripheral surface, said inner peripheral surface of said envelope defining an inner space;
    a plurality of bearing paths defined inside said inner space of said envelope for receiving articulation elements;
    a connection system comprising a flange extending radially relative to said central axis of said envelope, said flange being connected to said envelope and at least partially made of a material comprising a thermosetting or thermoplastic matrix reinforced with short fibers or particles;
    wherein said material comprising a thermosetting or thermoplastic matrix reinforced with short fibers or particles of said flange further extends into and partially fills said inner space of said envelope through one said axial end of said envelope;
    wherein said flange comprises a plurality of fixing holes that extend axially therethrough and which are evenly distributed about said central axis of said envelope, and wherein each said fixing hole is provided with a reinforcing element;
    wherein each said reinforcing element is a tubular metal insert;
    wherein said tubular metal inserts of said fixing holes define a means for centering said transmission joint body during an assembly operation; and
    wherein each said tubular metal insert has an outer annular surface at least partially covered by said material of said flange, said means for centering comprising portions of said outer annular surfaces that are uncovered.

11. A transmission joint body, comprising:
    an envelope having a central axis, an inner peripheral surface, opposite axial ends and an outer peripheral surface, said inner peripheral surface of said envelope defining an inner space;

a plurality of bearing paths defined inside said inner space of said envelope for receiving articulation elements;

a connection system comprising a flange extending radially relative to said central axis of said envelope, said flange being connected to said envelope and at least partially made of a material comprising a thermosetting or thermoplastic matrix reinforced with short fibers or particles;

wherein said material comprising a thermosetting or thermoplastic matrix reinforced with short fibers or particles of said flange further extends into and partially fills said inner space of said envelope through one said axial end of said envelope; and wherein a plurality of axial webs are integrally formed with said flange, said flange having a face from which said webs extend axially to said outer peripheral surface of said envelope.

12. A transmission joint body, comprising:

an envelope having a central axis, an inner peripheral surface, opposite axial ends and an outer peripheral surface, said inner peripheral surface of said envelope defining an inner space;

a plurality of bearing paths defined inside said inner space of said envelope for receiving articulation elements;

a connection system comprising a flange extending radially relative to said central axis of said envelope, said flange being connected to said envelope and at least partially made of a material comprising a thermosetting or thermoplastic matrix reinforced with short fibers or particles;

wherein said material comprising a thermosetting or thermoplastic matrix reinforced with short fibers or particles of said flange further extends into and partially fills said inner space of said envelope through one said axial end of said envelope; and wherein said flange is integrally formed with said material extending into and partially filling said inner space of said envelope;

wherein said material further covers the entire said outer peripheral surface of said envelope and extends into said inner space through both said axial ends; and wherein said material further forms a plurality of axial webs integrally formed with said flange, said flange having a face from which said webs extend axially to said material which covers said outer peripheral surface of said envelope.

13. The transmission joint body of claim 12, wherein said material extending into and partially filling said inner space of said envelope further defines a closing wall closing a said axial end of said joint body.

* * * * *